United States Patent
Liao

(10) Patent No.: US 8,385,849 B2
(45) Date of Patent: Feb. 26, 2013

(54) STANDBY MODE SWITCH SYSTEM AND COMMUNICATION DEVICE HAVING SAME

(75) Inventor: Ming-Yang Liao, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 228 days.

(21) Appl. No.: 12/961,412

(22) Filed: Dec. 6, 2010

(65) Prior Publication Data

US 2012/0088483 A1    Apr. 12, 2012

(51) Int. Cl.
*H04B 1/38* (2006.01)

(52) U.S. Cl. ............... 455/90.3; 455/550.1; 455/567; 455/67.11

(58) Field of Classification Search ........... 455/550.1, 455/567, 90.3, 67.11

See application file for complete search history.

(56) References Cited

U.S. PATENT DOCUMENTS

| | | | | |
|---|---|---|---|---|
| 7,469,155 | B2* | 12/2008 | Chu | 455/567 |
| 8,036,699 | B2* | 10/2011 | Araki | 455/550.1 |
| 2005/0208903 | A1* | 9/2005 | Sakamoto | 455/90.3 |
| 2007/0099574 | A1* | 5/2007 | Wang | 455/67.11 |
| 2009/0197635 | A1* | 8/2009 | Kim et al. | 455/550.1 |
| 2010/0159998 | A1* | 6/2010 | Luke et al. | 455/567 |
| 2010/0167794 | A1* | 7/2010 | Yin | 455/567 |

\* cited by examiner

*Primary Examiner* — April G Gonzales

(74) *Attorney, Agent, or Firm* — Altis Law Group, Inc.

(57) ABSTRACT

A standby mode switch system includes a mode selection module, a control module, and a position detection module. The mode selection module has a vibration mode. The control module is in communication with the mode selection module and the position detection module. The control module turns on the vibration mode when the mode selection module selects the vibration mode and an incoming call. The control module turns off the vibration mode when the position detection module detects a distance from the position detection module to an adjacent object element is greater than a predetermined value.

3 Claims, 7 Drawing Sheets

STANDBY MODE SWITCH SYSTEM AND COMMUNICATION DEVICE HAVING SAME

BACKGROUND

1. Technical Field

The present disclosure relates to communication devices and, particularly, to a communication device having a standby mode switch system.

2. Description of Related Art

Communication devices include a number of different standby modes, such as normal, silent, vibration, and outdoor modes. Sometimes, when the communication device is in vibration mode and it is placed on a table, the communication device may vibrate to an edge of the table during an incoming call. If the communication device cannot be reached or the vibration mode cannot be turned off immediately, the communication device may fall down from the table and get damaged.

Therefore, it is desirable to provide a communication device which can overcome the limitations described above.

DETAILED DESCRIPTION

Embodiments of the disclosure will now be described in detail with reference to the accompanying drawings.

Figure 1:
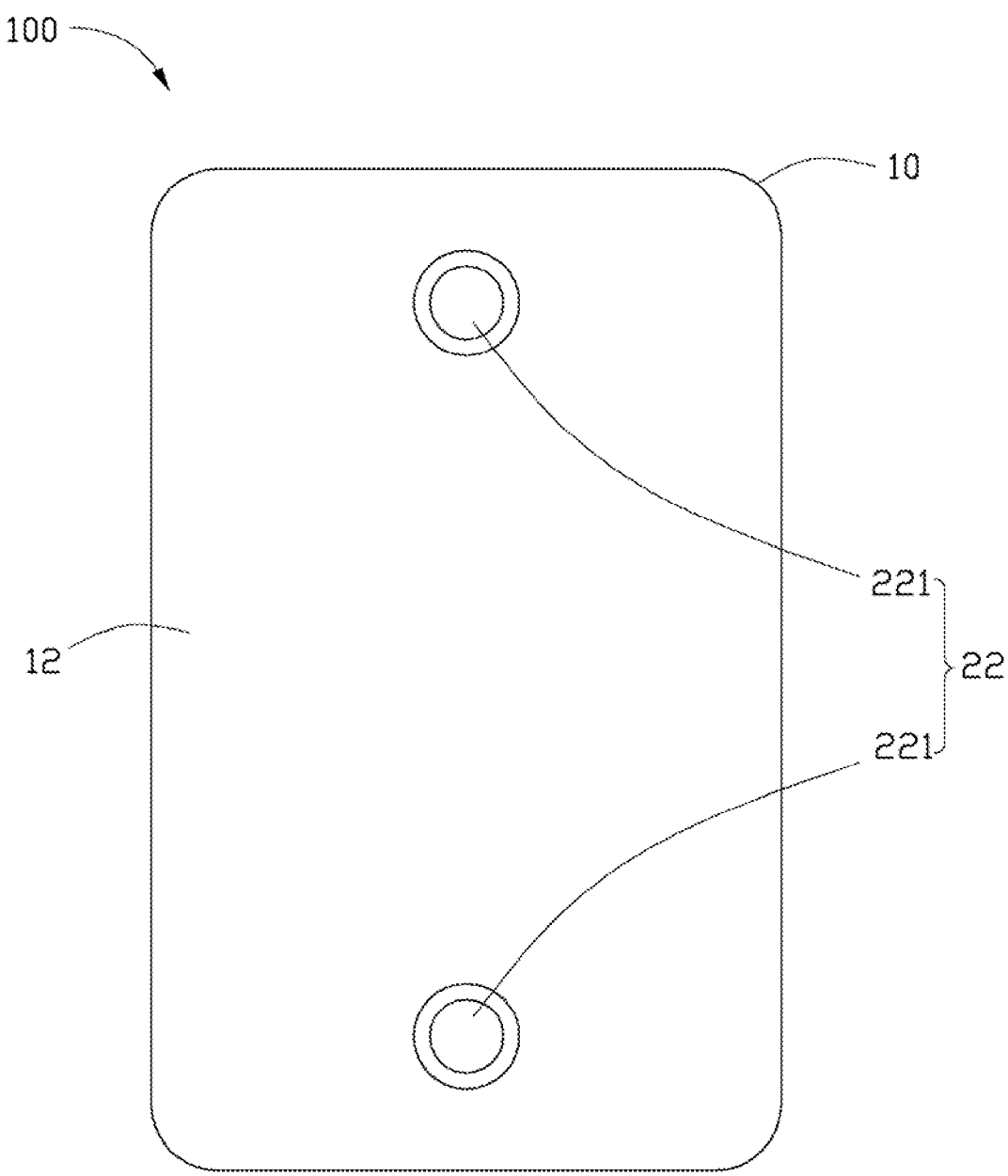
FIG. 1 is a back view of a communication device, according to an exemplary embodiment.
Figure 2:
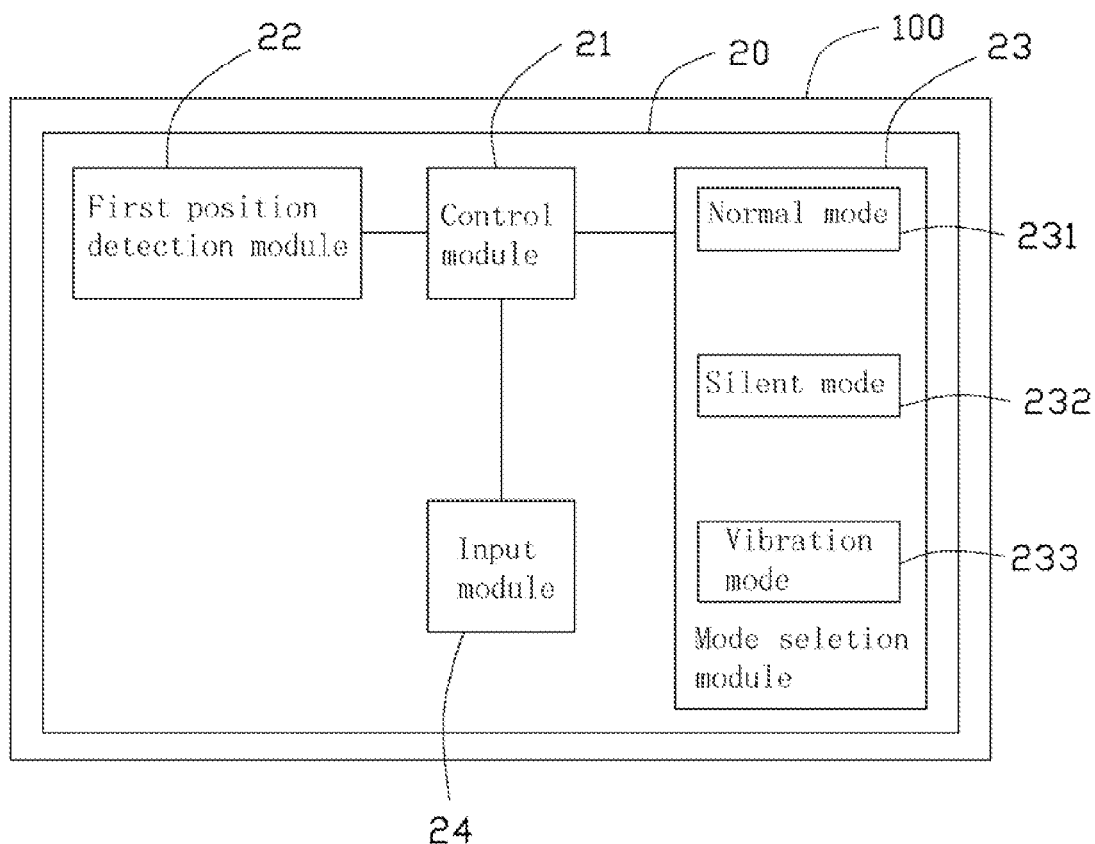
FIG. 2 is a functional block diagram of a standby mode switch system of the communication device of FIG. 1.
Figure 3:
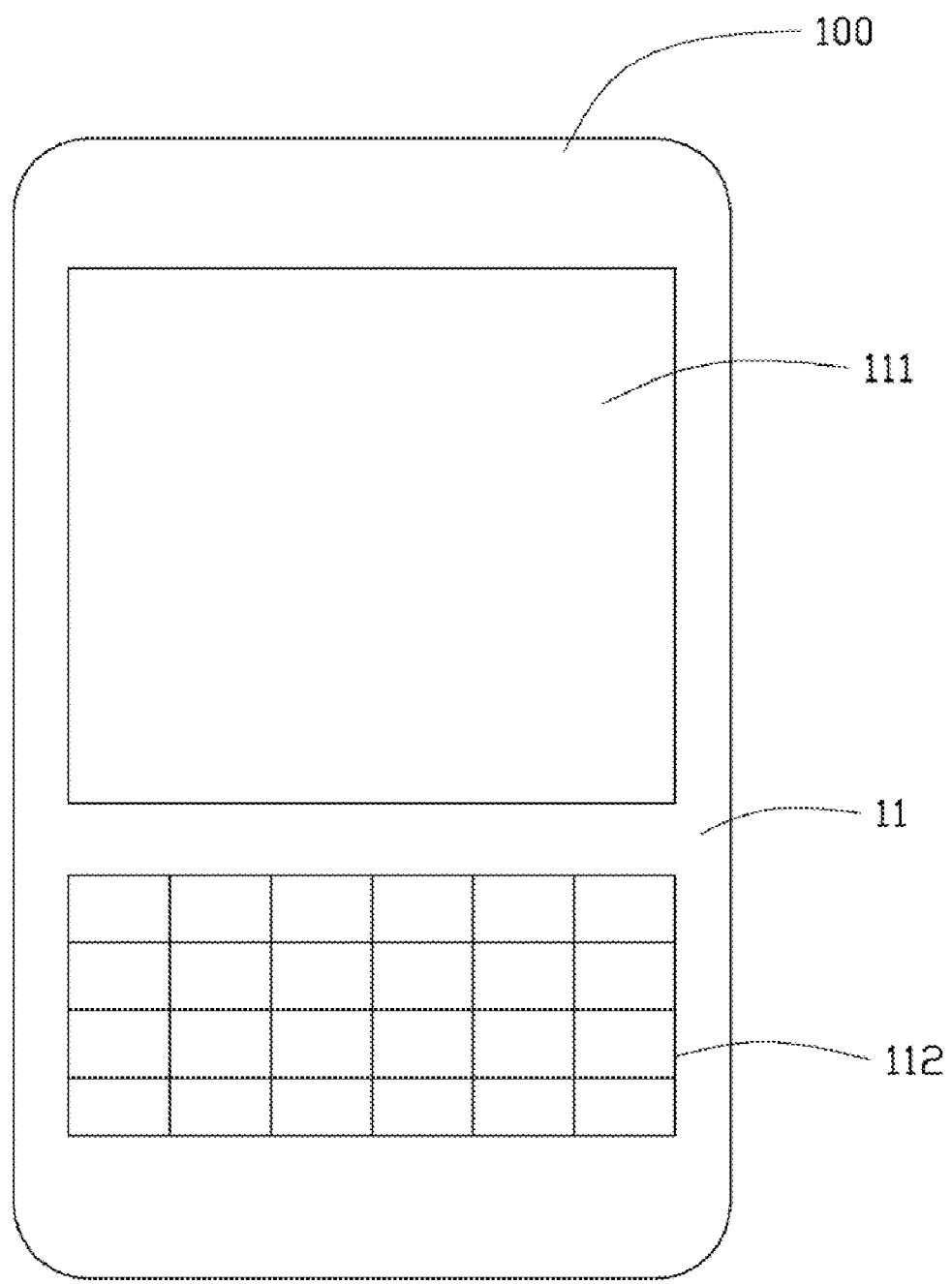
FIG. 3 is a front view of the communication device of FIG. 1.

Referring to FIGS. 1-3, a communication device 100 in accordance with a first exemplary embodiment is shown. The communication device 100 includes a main body 10 and a standby mode switch system 20. In this embodiment, the communication device 100 is a mobile phone.

The main body 10 is a rectangular configuration and includes a front surface 11 and a back surface 12 opposite to the front surface 11. A display area 111 and a keyboard area 112 are positioned on the front surface 11 and respectively adjacent to two ends of the main body 10.

The standby mode switch system 20 includes a control module 21, a first position detection module 22, a mode selection module 23, and an input module 24. The first position detection module 22, the mode selection module 23, and the input module 24 are all electrically connected to the control module 21.

The control module 21 is a microprocessor and has a memory (not shown) therein. The control module 21 is configured to control the mode selection module 23 to choose a standby mode according to input signals output from the first position detection module 22 or the input module 24.

The first position detection module 22 includes two distance sensors 221 positioned on two ends of the back surface 12. In the present embodiment, the two distance sensors 221 are ultrasonic distance sensors or optoelectronic distance sensors. When the distance from one of the distance sensors 221 to an adjacent object element is greater than a predetermine value, such as 2 mm, the distance sensors 221 output a detection signal.

The mode selection module 23 includes a number of different standby modes, such as a normal mode 231, a silent mode 232, and a vibration mode 233. The standby modes can be operation system program codes stored in the mode selection module 23, which can be selected by a user according to needs.

The input module 24 electrically connects to the keyboard area 112, the user inputs control signals to the input module 24 by the keyboard area 112. It should to be understood, the keyboard area 112 can be a touch screen.

In use, the user first switches the standby modes of the communication device 100 to the vibration mode 233, and then places the communication device 100 on a table in a manner that the back surface 12 opposes the table. When an incoming call, the communication device 100 vibrates to move on the table with the force of the vibration. The two distance sensors 221 positioned on the back surface 12 of the main body 10 detect the position. When the distance from the distance sensor 221 to the table detected by one of the distance sensors 221 is greater than the predetermine value, it means that the corresponding end of the main body 10 protrudes from an edge of the table. The distance sensor 221 outputs a detection signal to the control module 21. The control module 21 turns off the vibration mode 233 and switches to normal mode 231.

In this embodiment, after the communication device 100 is switched to the normal mode 231, the communication device 100 sends out a sound to warn the user to answer the phone or place the communication device 100 in a safe place.

Figure 4:
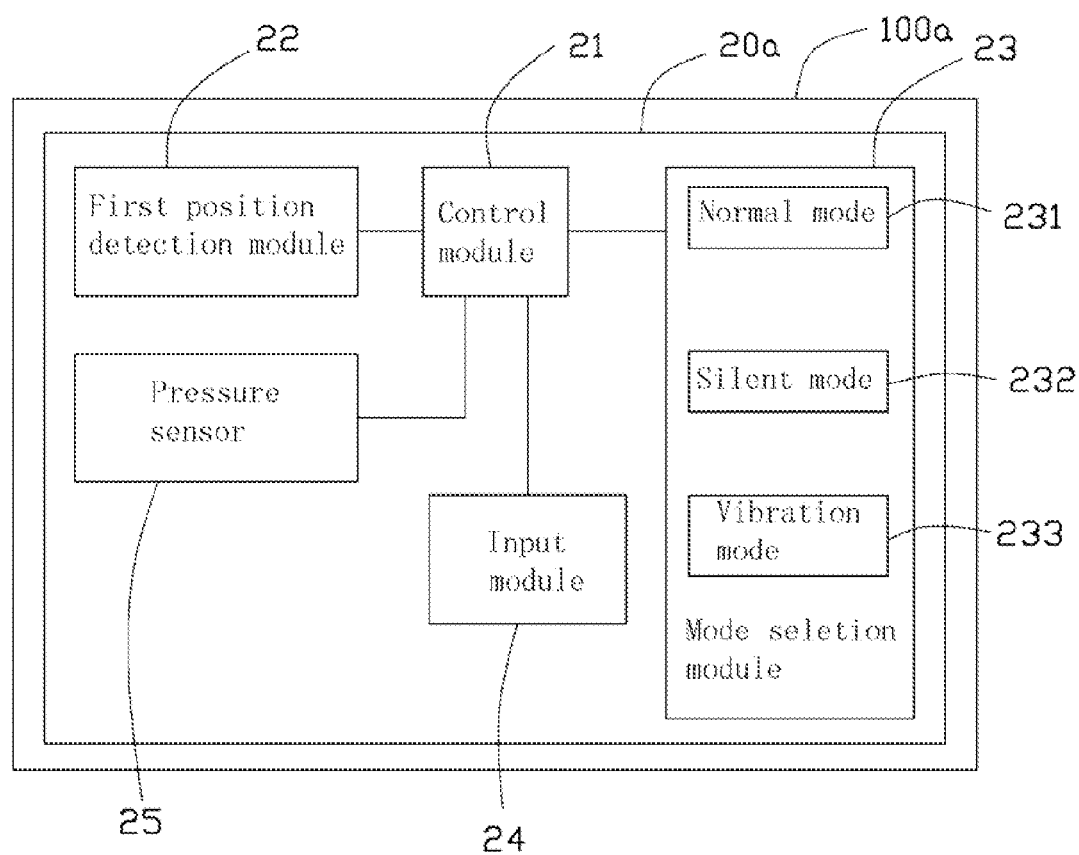
FIG. 4 is a functional block diagram of a standby mode switch system of a communication device, according to a second exemplary embodiment.
Figure 5:
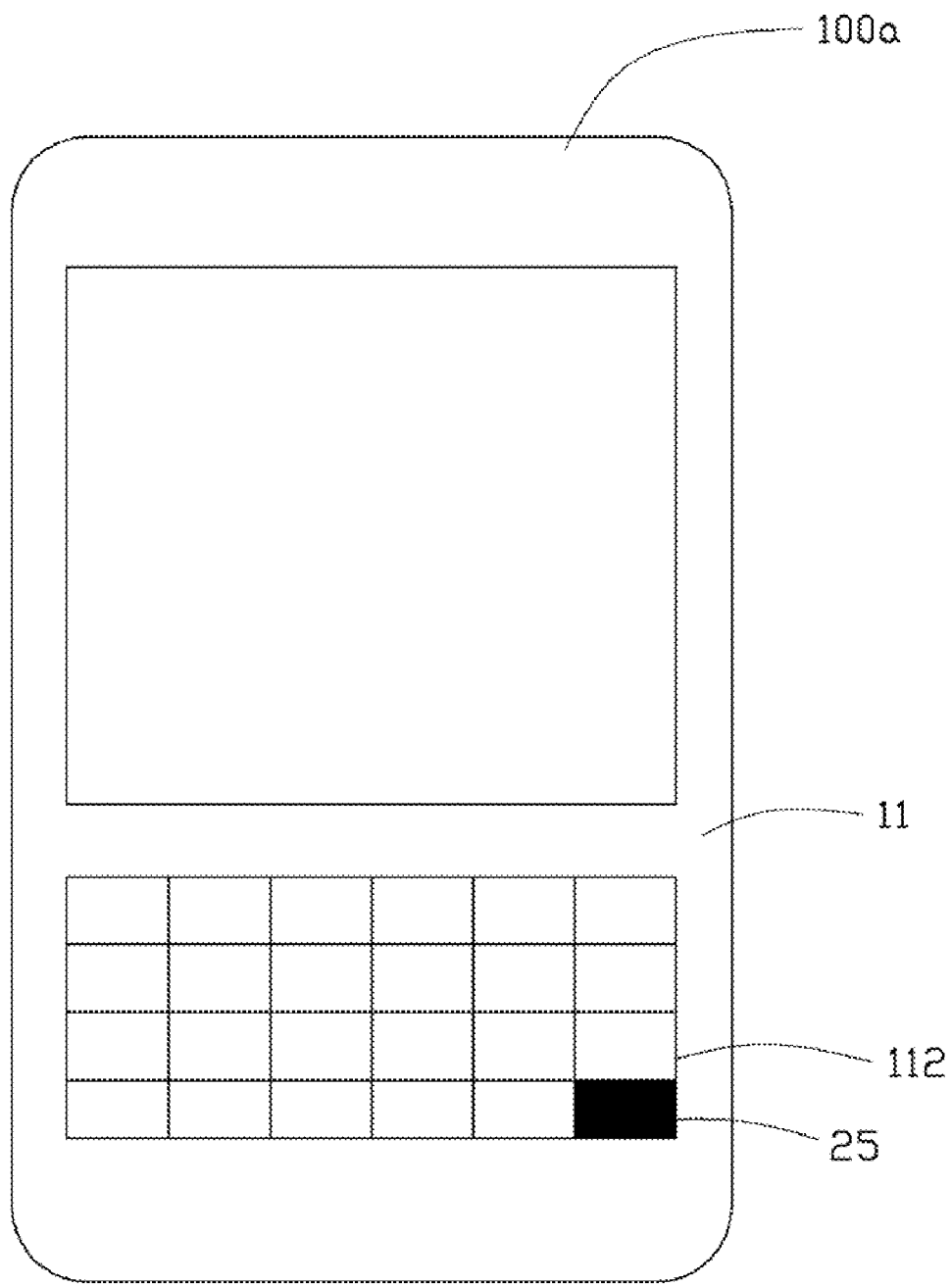
FIG. 5 is a front view of the communication device of FIG. 4.

Referring to FIGS. 4-5, a communication device 100a including a standby mode switch system 20a according to a second embodiment is shown. The difference between the standby mode switch system 20a and the standby mode switch system 20 of the first exemplary embodiment is that the standby mode switch system 20a further includes a pressure sensor 25 connected to the control module 21. The pressure sensor 25 is positioned at the keyboard area 112 of the front surface 11 and protrudes from the key board area 112. In this embodiment, the pressure sensor 25 is positioned at a corner of the keyboard area 112.

It should to be understood, the pressure sensor 25 can be positioned anywhere on the front surface 11, but the pressure sensor 25 must be protruding from the front surface 11. When the communication device 100a is placed on the table and the front surface 11 opposes the table, the pressure sensor 25 can contact with the table.

When the user places the communication device 100 on a table and the back surface 12 opposes the table, the pressure sensor 25 cannot detect pressure. The control module 21 turns on the first position detection module 22 according to a first signal output from the pressure sensor 25. When the user places the communication device 100a on a table and the front surface 11 opposes the table, the pressure sensor 25 detects pressure. The control module 21 turns off the first position detection module 22 according to a second signal output from the pressure sensor 25 and switches the vibration mode 233 to the normal mode 231 with the mode selection module 24.

Figure 6:
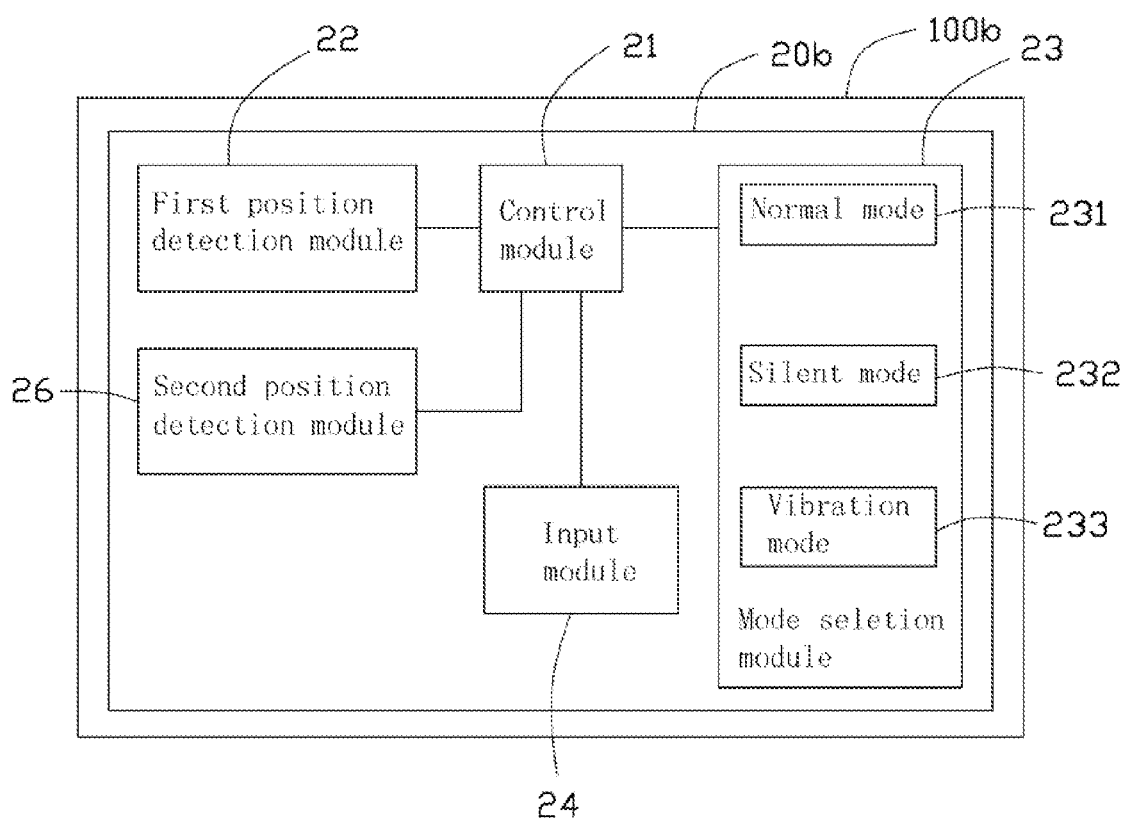
FIG. 6 is a functional block diagram of a standby mode switch system of a communication device, according to a third exemplary embodiment.
Figure 7:
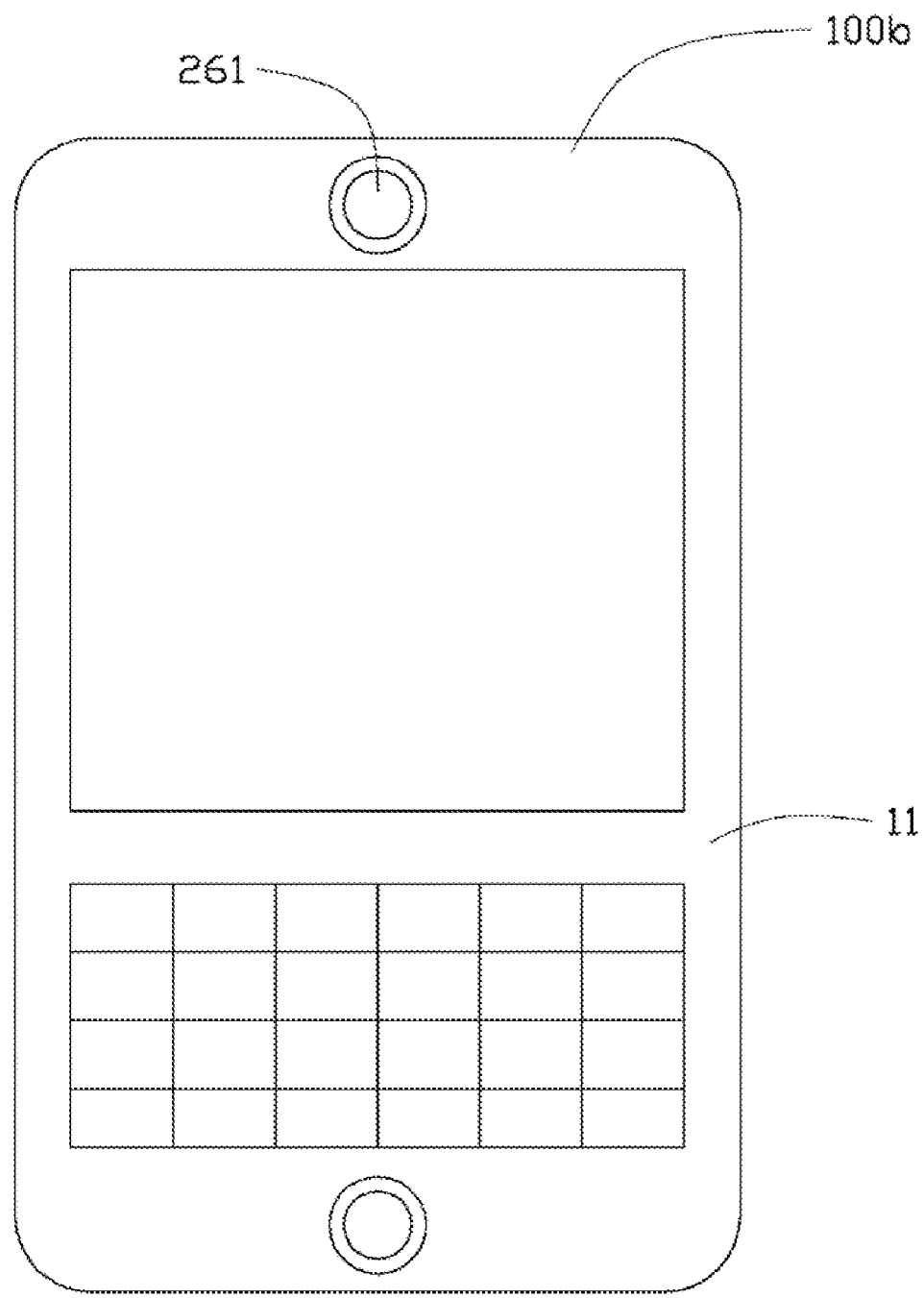
FIG. 7 is a front view of the communication device of FIG. 6.

Referring to FIGS. 6-7, a communication device 100b including a standby mode switch system 20b according to a third embodiment is shown. The difference between the standby mode switch system 20b and the standby mode switch system 20 of the first exemplary embodiment is that the standby mode switch system 20a further includes a second position detection module 26. The second position detection module 26 includes two distance sensors 261 positioned on two ends of the front surface 11.

Initially, the first position detection module 22 and the second position detection module 26 are turned on. When the user places the communication device 100b on a table with the back surface 12 opposing the table, the first position detection module 22 and the second position detection module 26 detect the position themselves and outputs different detection signals to the control module 21. The control module 21 turns on the first position detection module 22 and turns off the second position detection module 26. The first position detection module 22 detects whether the main body 10 protrudes from an edge of the table. When the user places the communication device 100b on a table with the front surface 11 opposing the table, the control module 21 turns on the second position detection module 26, and turns off the first position detection module 22 module, the second position detection module 26 detects whether the main body 10 protrudes from an edge of the table.

Particular embodiments are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A communication device comprising:
    a main body comprising a front surface and a back surface opposite to the front surface; and
    a standby mode switch system comprising:
        a mode selection module comprising a vibration mode;
        a first position detection module positioned on the back surface of the main body;
        a second position detection module positioned on the front surface of the main body; and
        a control module connecting to the mode selection module, the first position detection module, and the second position detection;
    wherein the control module is configured for turning on one of the first and the second position detection modules and turning off the other one of the first and the second position detection modules according to detection signals output from the first and the second position detection modules, the control module is configured for turning on the vibration mode when the mode selection module selects the vibration mode and an incoming call, the control module is configured for turning off the vibration mode when the first position detection module detects a distance from the first position detection module to an adjacent object element is greater than a predetermined value, and the control module is configured for turning off the vibration mode when the second position detection module detects a distance from the second position detection module to the adjacent object element is greater than the predetermined value.

2. The communication device of claim 1, wherein the mode selection module further comprises a normal mode, the control module is configured for turning on the normal mode when the vibration mode is turned off.

3. The communication device of claim 1, wherein the first position detection module comprises two distance sensors respectively positioned on two ends of the back surface, the second position detection module comprises two distance sensors respectively positioned on two ends of the front surface.

* * * * *